No. 794,992. PATENTED JULY 18, 1905.
R. J. & J. A. LONDON.
PLATE HOLDER FOR PHOTOGRAPHIC CAMERAS.
APPLICATION FILED JAN. 10, 1905.

Witnesses

Robert J. London and
James A. London, Inventors by C. A. Snow & Co.
Attorneys

No. 794,992. PATENTED JULY 18, 1905.
R. J. & J. A. LONDON.
PLATE HOLDER FOR PHOTOGRAPHIC CAMERAS.
APPLICATION FILED JAN. 10, 1905.

Witnesses
E. H. Stewart
S. N. Acker

Robert J. London
James A. London Inventors
by C. A. Snow & Co
Attorneys

No. 794,992. PATENTED JULY 18, 1905.
R. J. & J. A. LONDON.
PLATE HOLDER FOR PHOTOGRAPHIC CAMERAS.
APPLICATION FILED JAN. 10, 1905.

Witnesses

Robert J. London
James A. London
Inventors
by C. A. Snow & Co.
Attorneys

Witnesses

Robert J. London
James A. London Inventors

No. 794,992. Patented July 18, 1905.

UNITED STATES PATENT OFFICE.

ROBERT JOSHUA LONDON AND JAMES ALLEN LONDON, OF FREDERICKTOWN, MISSOURI.

PLATE-HOLDER FOR PHOTOGRAPHIC CAMERAS.

SPECIFICATION forming part of Letters Patent No. 794,992, dated July 18, 1905.

Application filed January 10, 1905. Serial No. 240,465.

*To all whom it may concern:*

Be it known that we, ROBERT JOSHUA LONDON and JAMES ALLEN LONDON, citizens of the United States, residing at Fredericktown, in the county of Madison and State of Missouri, have invented a new and useful Plate-Holder for Photographic Cameras, of which the following is a specification.

In photographic work where a series or stack of sensitized plates are carried by a magazine plate-holder it is usually necessary after each exposure to remove the plate-holder and carry the same to a dark room, where the exposed plate is removed, and then the plate-holder is returned to the camera in order that the next plate may be exposed, the operation of removing and reapplying the plate-holder to the camera-box being involved for each plate, thereby materially interfering with the successive rapid exposures of the several plates. Having appreciated this objection, it is proposed to provide novel means for successively removing the exposed sensitized plates from the plate-holder in such a manner as to permit of the same being transferred to a dark room without requiring that the plate-holder be removed from the camera. In this connection it is designed to employ a carrier in the nature of a dark box capable of convenient detachable connection with the plate-holder and arranged to receive a plate after having been exposed and then capable of being removed from the plate-holder and transferred to a dark room to permit of the removal of the plate from the dark box or carrier.

Another object is to embody the invention in the nature of a plate-holder capable of being readily applied and removed with respect to a camera to permit charging of the holder and also to equip the plate-holder with a magazine to contain a stack or series of sensitized plates and capable of being shifted to turn the plates from a vertical to a horizontal position, and vice versa, according to the nature of the exposure desired.

A still further object of the invention is to equip the device with a conveyer for transferring each exposed plate from the plate-holder to the dark box and to provide for conveniently discharging the successive exposed plates from the magazine to the conveyer and at the same time to set in operation the normally inactive conveyer.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings.

Like characters of reference designate corresponding parts in each and every figure of the drawings.

The several parts of the present invention are carried by a casing in the nature of a magazine plate-holder, which has been shown in the drawings as made up of a back 1, a top 2, a bottom 3, and opposite sides 3' and 4, the front of the holder being open and normally closed by the usual slide 5, working in a guideway 6, which opens through one side of the holder to permit insertion and removal of the slide.

As hereinbefore indicated, it is proposed to effect successive removal of the exposed plates from the plate-holder without necessitating the removal of the plate-holder from the camera and transferring the same to a dark room, and to accomplish this object one side 3' of the plate-holder is provided with an upright slot or opening 7, through which the front member of a stack of plates may be removed in an edgewise direction and received within a dark box or carrier 9, which is detachably supported upon the plate-holder and is provided with a slot 8, registering with the slot 7 of the holder to permit of the plate being transferred from the holder to the carrier. For the detachable support of the carrier a horizontally-disposed bracket 10 is carried by the bottom of the plate-holder and is projected at the side 3' thereof, said bracket being provided with perforations to receive projections 13 upon the bottom of the carrier. A suitable spring-clip 11 is attached to the upper portion of the side 3' of the plate-holder and is adapted to snap over a projection or shoulder 12 upon the top of the carrier. Normally the discharge-opening 7 in the plate-holder is closed by an upright slide 15, working in suitable guideways 16 in the opposite edges of the opening, and a similar slide 15' normally closes the entrance-slot 8 of the carrier and works in suitable guideways 17. These slides project at the tops of the plate-holder and the dark box or carrier and are provided at their upper ends with suitable handles for convenience in manipulating the same. It will now be understood that the dark box or carrier 9 may be conveniently attached to the plate-holder by placing the bottom of the box upon the bracket 10, with the projections 13 received in the perforations of the bracket, and then pressing the upper portion of the carrier against the plate-holder, so as to snap the shoulder or projection 12 into engagement with the spring-clip or catch 11. To remove the dark box or carrier, the outer end thereof is tilted downwardly, so as to withdraw the shoulder 12 from the catch 11, and then the box is lifted from the bracket 10. To give access to the interior of the dark box for removing the exposed sensitized plate, a suitable door 14 is provided at the back of the box.

Within the plate-holder is a magazine 18 in the nature of a substantially rectangular box which is open at its front and is rotatably supported upon a push rod or stem 19, rigidly projecting rearwardly from the center of the back of the magazine and rotatably piercing the back of the plate-holder. A handle or knob 21 is provided upon the rear extremity of this pin or stem, and a helical spring 20 embraces the rear projecting portion of the stem and bears in opposite directions against the knob and the back of the plate-holder, so as to yieldably retain the magazine at the rearward limit of its movement. Upon the back of the magazine are diametrically opposite projections 22, which are designed to take into seats or sockets 23, formed in the front of the back of the plate-holder, so as to normally prevent rotation of the magazine. By pressing inwardly or forwardly upon the knob 21 of the push-rod 19 the magazine may be moved forwardly against the tension of the spring 20, so as to disengage the projections 22 from the adjacent seats or sockets 23, whereupon the magazine may be rotated by manipulating the knob or handle to bring the magazine into a position at right angles to its original position, and upon releasing the knob or handle the spring 20 will retract the magazine into engagement with the back of the plate-holder, so as to seat the projections 22 in other seats or sockets 23, alined at substantially right angles to the seats or sockets originally occupied by the projections. By this construction and arrangement the stack of plates 33, which are contained within the magazine, may be disposed with their longest dimension vertically or horizontally, as may be desired, and may be quickly changed from one position to the other without removal of the magazine and without interfering with any of the other parts of the device. A suitable follower 31 is located between the back of the stack of plates and the back of the magazine, and between the follower and the back of the magazine there is a tension device consisting of a helical spring 30, connected to the back of the magazine and bearing against the back of the follower to place an outward or forward tension upon the stack of plates.

To retain the stack of plates within the magazine against the tension of the spring-pressed follower, a pair of substantially L-shaped spring-fingers 35 are let into recesses 36 in opposite sides of the magazine and extend in a direction from front to rear thereof, the rear ends of the springs being fixed to the magazine by means of suitable fastenings 37. The transverse member 38 of each spring is at the free front end thereof and overlaps the adjacent edge of the front plate of the stack, so as to prevent accidental forward displacement thereof, each spring capable of being sprung laterally away from the stack to permit displacement of the foremost plate after it has been exposed and it is desired to remove said plate from the carrier. Located midway between each pair of spring-fingers 35 is another spring-finger 34, which is mounted in the same manner as described for the fingers 35, but is somewhat shorter than said fingers in order that its free transverse member may be engaged back of the foremost plate of the stack of plates, so as to select or separate said plate from the stack and prevent displacement of the latter when the foremost plate is pushed out of the magazine. It will here be explained that it is proposed to simultaneously withdraw all of the spring-fingers 35 from engagement with the front plate in order that the latter may be displaced forwardly out of the magazine by the action of the spring-pressed follower 31, during which operation the spring-fingers 34 serve to retain the remaining plates within the magazine.

When a plate is displaced forwardly through the open front of the magazine, it drops downward upon the endless conveyer 24, working in the bottom of the plate-holder and traveling over suitable rollers 25 and 26, mounted upon shafts 27 and 28, the shaft 27 being projected through the back of the plate-holder and constituting an extension of the drive-shaft of the suitable spring-motor 29, mounted upon the back of the plate-holder, whereby the conveyer is actuated. It will of course be understood that the upper ply of the conveyer travels in the direction of the arrow shown in Fig. 2 of the drawings and is alined with the discharge slot or opening 7 in the side 3' of the plate-holder in order that the plate may be automatically discharged through the opening 7 and through the opening 8 into the dark box or carrier 9, the slides 15 and 15' of course having been previously elevated to permit of the transfer of the plate from the plate-holder to the dark box. After the plate has been thus transferred the slides 15 and 15' are of course returned to their normal closed positions, so as to exclude light from the interiors of the plate-holder and the dark box, and then the latter may be detached from the plate-holder and taken to a dark room for the purpose of removing the exposed sensitized plate therefrom. In addition to the retaining spring-fingers 34 and 35 there is a spring crank-arm 32, having one end portion secured to the front of one side of the magazine, as at 32$^a$, with its other free portion lying across and in engagement with the front of the foremost plate adjacent one edge thereof.

For the purpose of moving the spring-fingers 35 out of engagement with the stack of plates there are provided two rock-bars 39 and 39$^a$, which extend through the recesses 36 at each side of the magazine and are provided with crank-bends 52, which work in the recesses between the respective spring-fingers 35 and the stack of plates, so that by turning the rock-bars so as to swing the crank-bends outwardly the spring-fingers 35 will be drawn away from the stack of plates. Between each pair of crank-bends 52 each of the rock-bars 39 and 39$^a$ is provided with another crank-bend 51, which is disposed opposite the crank-bends 52 and lies against what will be termed the "outer" side of the spring-finger 34, whereby the latter will be forced inwardly when the fingers 35 are forced outwardly for the purpose of assisting in displacing the foremost plate from the magazine and at the same time to prevent displacement of the remaining plates by the tension of the spring-follower. The corresponding ends of the rock-bars 39 and 39$^a$ project at the same edge of the magazine and are respectively provided with the terminal cranks 53 and 54, there being a connecting-rod 55 extending between said crank-arms, whereby a rotary movement imparted to one of the rock-bars will be simultaneously imparted to the other rock-bar.

The means for rotating the rock-bars 39 and 39$^a$ includes a tumbling-shaft 40, which is disposed between adjacent edges of the magazine and the plate-holder with its opposite ends suitably journaled in the frame of the plate-holder, one end being projected externally of the plate-holder and provided with a ring 41 or other suitable form of handle for manually rotating or tumbling the shaft. A crank-bend 58 is formed in the tumbling-shaft 40, adjacent the crank 53 of the rock-bar 39, and a pull-rod 57 is pivotally connected to this crank and works in guides 59, secured to the inner side of the upper portion of the back of the plate-holder. This pull-rod is provided with an arm or projection 56, which is arranged to contact with the crank 53 when the tumbling-shaft 40 is rotated in one direction, thereby to rotate the two shafts 39 and 39$^a$ to simultaneously release the spring-fingers 35 at opposite sides of the magazine and at the same time to draw the fingers 34 inwardly between the foremost sensitized plate and the succeeding one in the manner hereinbefore described. It will now be understood that the spring-fingers 35 are normally active to hold the sensitized plates in the magazine, while the spring-fingers 34 are normally inactive and are rendered active to prevent displacement of the stack of plates only when the fingers 35 are withdrawn to permit displacement of the foremost plate.

To charge the magazine with plates, the spring member 32 is drawn aside, and one edge of the stack of plates is introduced through the open front of the magazine, and then the other edge is pressed against the front sides of the spring-fingers 35, which are free to yield outwardly, so as to permit of the stack of plates being pushed into the magazine, after which the spring-fingers snap back into their normal positions in front of the stack of plates, so as to retain the latter in the magazine. The intermediate fingers 34 being normally at the outside of the inner peripheral edge of the magazine of course do not interfere with the introduction of the plates, and as the crank-bends 52 are at the inner sides of the spring-fingers 35 the latter are free to move outwardly under the pressure of the plates when forcing the same into the magazine.

Figure 1:
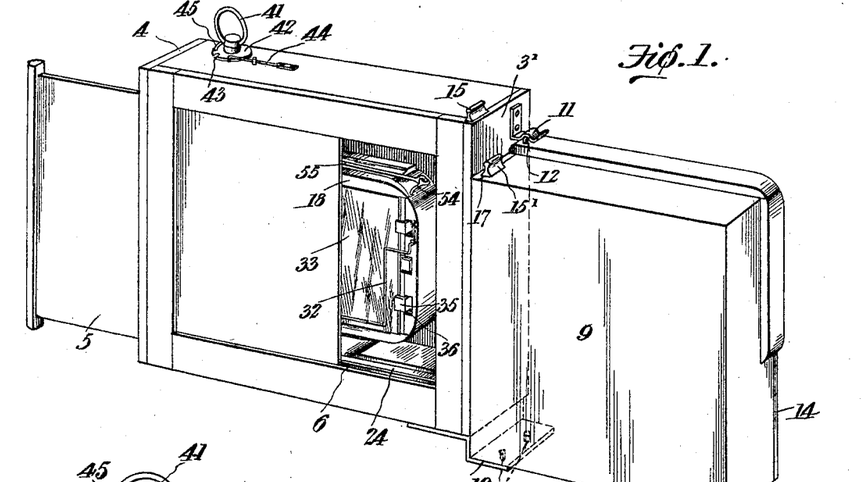
Figure 1 is a view in perspective of the apparatus.
Figures 2, 8:
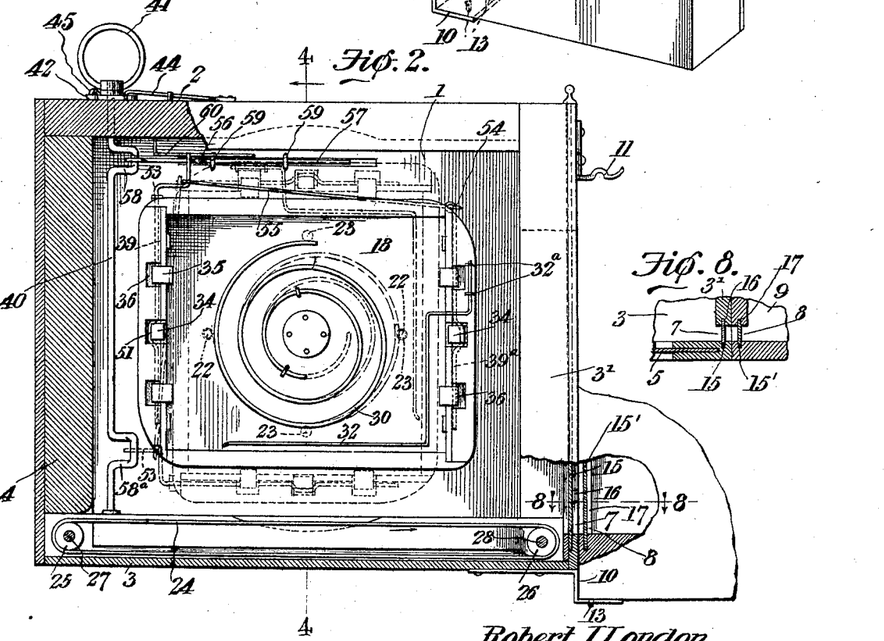
Fig. 2 is a front elevation of the casing inclosing the plate-holder with its closure-slide removed and a portion of the front of the casing broken away and the vertical position of the holder being shown by dotted lines.
Fig. 8 is a detail cross-sectional view on the line 8 8 of Fig. 2.
Figure 3:
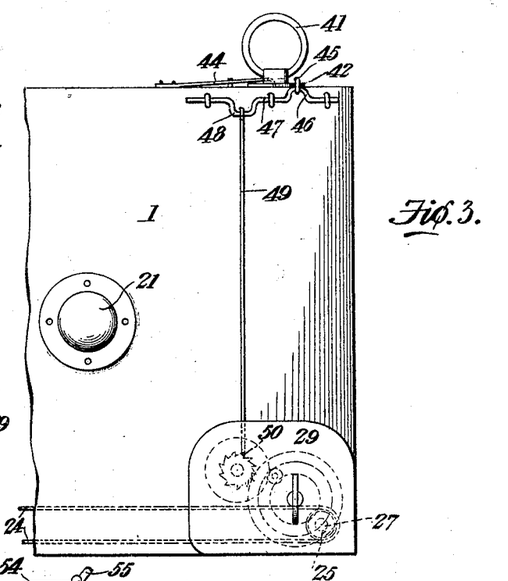
Fig. 3 is a partial rear elevation of the holder-casing.

When the magazine has been rotatably shifted from its full-line position to its dotted-line position, as indicated in Fig. 2 of the drawings, the crank-terminal 53 of the rock-bar 39 will be brought into the path of a crank-bend 58$^a$, adjacent the lower end of the tumbling-shaft 40, whereby the bar 39 may be rocked by contact of the crank-arm 58$^a$ with the crank 53, thereby to insure the proper operation of the rock-bars 39 and 39$^a$ in either position of the magazine.

Figure 4:
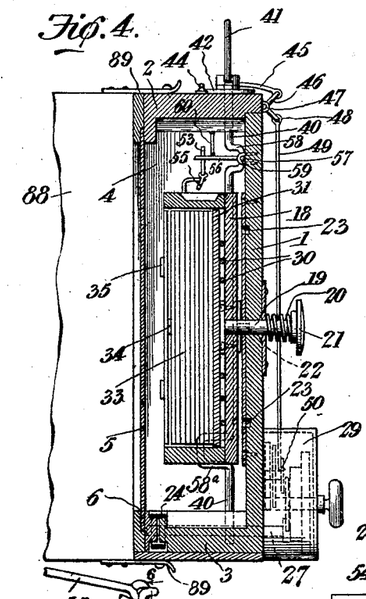
Fig. 4 is a vertical section on the line 4 4 of Fig. 2.
Figure 5:
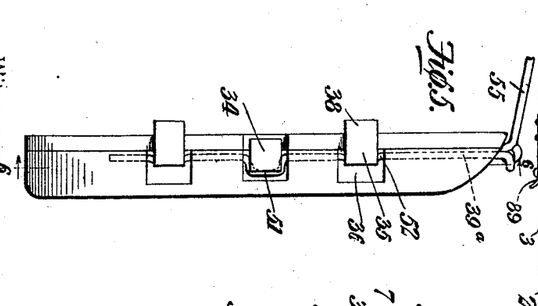
Fig. 5 is a detail elevation of the gripping means.
Figures 6, 7:
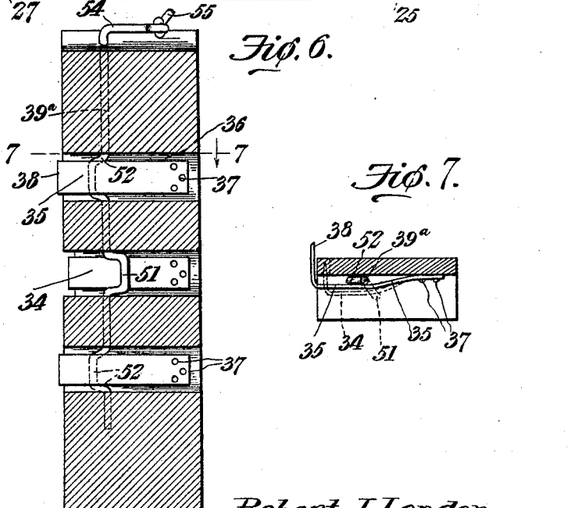
Fig. 6 is a sectional view of the same on the line 6 6 of Fig. 5.
Fig. 7 is a transverse section on the line 7 7 of Fig. 6.

By reference to Figs. 2 and 4 of the drawings it will be noted that the crank-terminal 53 normally sets at an angle of about forty-five degrees to the front of the magazine and is therefore in position to be struck by the crank-bend 58$^a$, and thereby rotated to pull upon the rod 55.

It will of course be understood that the conveyer 24 is normally inactive, and it is proposed to throw the conveyer into operation simultaneously with the releasing and displacement of the foremost sensitized plate, and this result is obtained by the provision of means to release or start the motor 29 by the manipulation of the handle 41 to actuate the rock-bars 39 and 39$^a$. This means consists of an endwise-shiftable trip-rod 49, located at the back of the plate-carrier with its lower end piercing the top of the motor-casing and provided with a finger 50, engaging the escapement of the motor to normally hold the latter inactive. The upper end of this trip-rod is connected to a crank-bend 48 of a crank-shaft 47, mounted upon the back of the plate-holder, said shaft being provided with another crank-bend 46, disposed at substantially right angles to the crank 48. A connecting-rod 45 extends between the crank 46 and a head or plate 42, carried by the top of the shaft 40, whereby manipulation of the handle 41 to actuate the shaft 40 also operates to withdraw the trip-rod 49 from the escapement of the spring-motor, which releases the latter and actuates the conveyer 24 simultaneously with the release and displacement of the foremost sensitized plate. The plate or head 42 is provided with a pair of peripheral notches 43 for alternate engagement by a spring dog or pawl 44, carried by the top of the plate-holder, so as to hold the shaft 40 at either limit.

While the means hereinbefore described for actuating the spring-fingers to release a sensitized plate and to throw the motor into operation is effective for the purpose designed, we have also provided a simpler and preferred mechanism, as illustrated in Figs. 9 to 16, inclusive, which will now be explained.

In the preferred embodiment of the invention the general features of the plate-holder and the dark box or carrier are the same as hereinbefore described, and therefore it is not necessary to again enter into details of these parts. The magazine 61 is somewhat lighter than the magazine 18 and is preferably formed of metal, and instead of mounting the plate-holding spring-fingers in recesses in the magazine each of the springs 62 and 63 is secured to the outer edge of the magazine, as clearly indicated in Fig. 13, and the rock-bars 64 and 65 are also mounted upon the exterior of the magazine, each rock-bar being provided with an intermediate crank 66, embracing the outer side of the spring 63 and also provided with upper and lower crank-bends 67, lying between the spring-fingers 62 and the magazine in the same relation as hereinbefore described.

Upon the back of the magazine is a post 68, which terminates short of the back of the plate-holder and is provided at its outer end with a cross-head 69, having projections 70 at its opposite ends and directed toward the back of the plate-carrier. A stem or pin 71 rotatably pierces the back of the plate-holder and is rigidly connected to the rear end of the post 68—as, for instance, by a threaded connection—the outer extremity of the stem or pin being provided with a knob or handle 72 and there being a helical spring 73 embracing the projected portion of the stem and bearing in opposite directions against the knob and the back of the plate-carrier to yieldably retain the magazine at the rearward limit of its movement, with the projections 70 engaged with diametrically opposite seats or sockets 74, provided upon the front face of the back of the plate-holder. These sockets preferably are in the nature of openings in a metallic ring 75, secured to the front face of the back of the plate-holder and provided with two pairs of sockets alined at substantially right angles to one another, whereby the magazine may be held in either of two positions in substantially the same manner as previously described.

Figure 13:
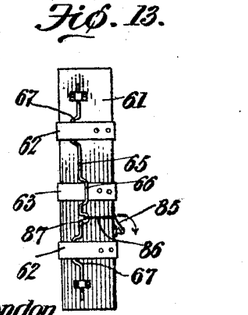
Fig. 13 is a side elevation of the magazine.
Figure 14:
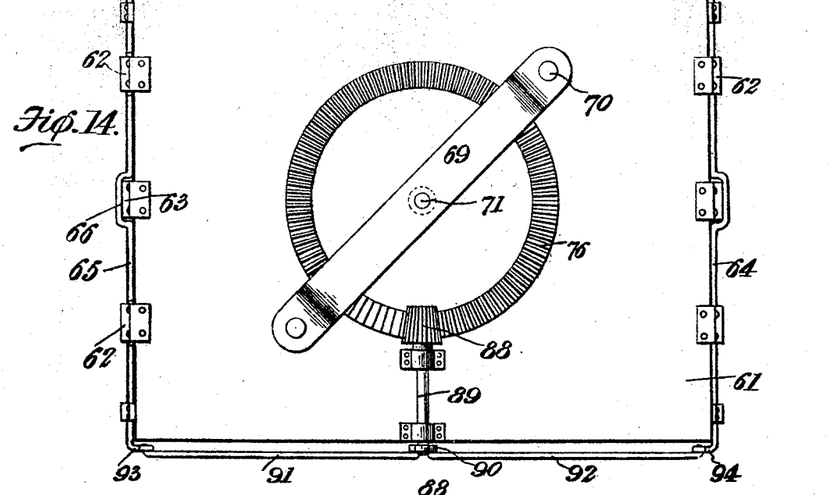
Fig. 14 is a view similar to Fig. 12, showing another embodiment of a portion of the means for releasing the exposed plates from a stack of plates.
Figure 15:
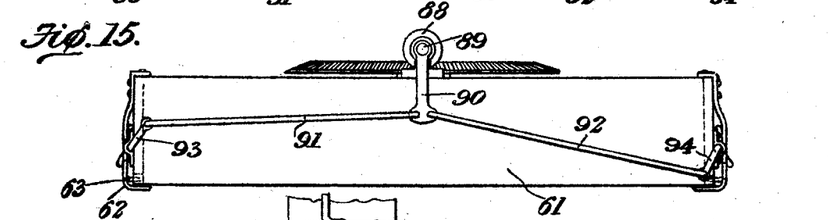
Fig. 15 is an edge view thereof.
Figure 16:
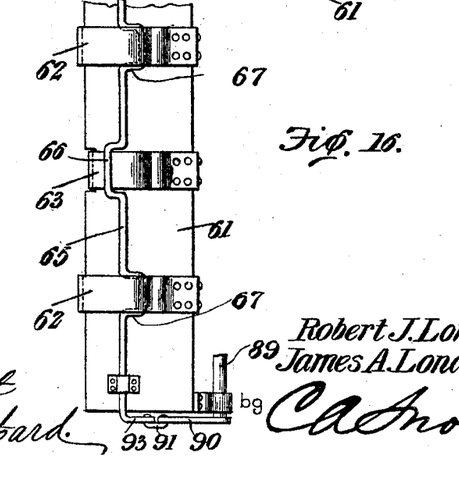
Fig. 16 is another edge view at right angles to Fig. 15.

The means for operating the rock-bars 64 and 65 includes a beveled gear 76, loosely mounted upon the post 68 and driven by a beveled pinion 77 in mesh with the gear and carried by the lower end of an upright shaft 78, journaled adjacent its lower end in a bearing 79 at the top of the ring 75, the upper end of the shaft piercing the top of the plate-holder and being provided with a suitable handle or finger-piece 80, whereby the shaft may be rotated. Journaled upon the rear side of the back of the magazine are opposite radial counter-shafts 81 and 82, which are provided at their inner end with the respective beveled pinions 83 and 84 in mesh with the gear 76, the outer end of each counter-shaft, as best shown in Fig. 13, being provided with a crank-arm 85, lying at the adjacent outer edge of the magazine and having a connecting rod or link 86 engaged with a crank 87 upon the adjacent rock-bar. From this construction manipulation of the finger-piece 80 to rotate the shaft 78 operates to rotate the gear 76 upon the post 68, thereby rotating the pinions 83 and 84 and the shafts 81 and 82, the cranks and connecting rods or links at the outer ends of the counter-shafts operating to simultaneously rock the rock-bars 64 and 65 and in turn simultaneously actuate the spring-fingers which hold the sensitized plates. It will here be noted that when the knob 72 is pushed in to disengage the projections 70 of the cross-bar 69 from the seats in the back of the plate-holder preparatory to rotatably shifting the magazine the gear 76 will likewise be shifted out of engagement with the pinion 77, and therefore the rotation of the magazine will have no effect to rotate the gear 76 and operate the rock-bars 64 and 65. When the push rod or stem 71 is released and the magazine is returned to its rear limit, the gear 76 will again mesh with the pinion 77 and the rock-bar-actuating mechanism will again be in condition for operation.

As in the first-described embodiment of the invention, the motor 29 is carried to the back of the plate-holder and is normally held inactive by the trip-rod 49, which is controlled by a double crank-shaft 47, as shown in detail in Fig. 4 of the drawings, and the shaft 47 being in turn controlled by the connecting-rod 45 engaging the plate or head 42 upon the top of the shaft 78, all of which has been previously fully described and requires no change in the preferred embodiment of the invention.

Figure 9:
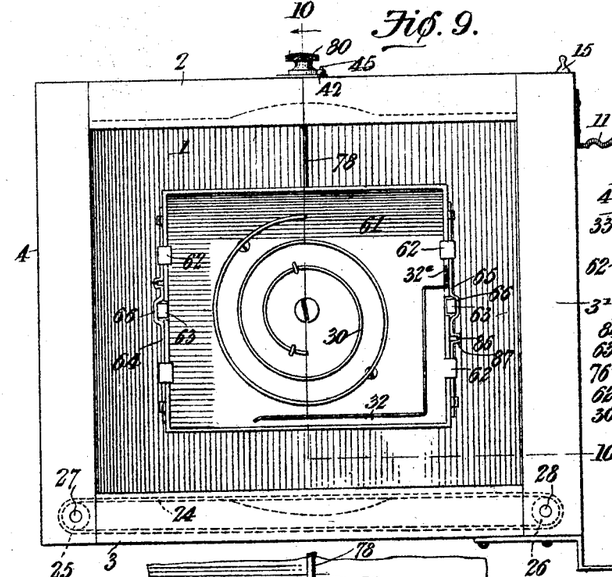
Fig. 9 is a front elevation of the plate-holder with the closure-slide and the stack of plates removed to illustrate another embodiment of means for successively releasing the exposed plates from a stack of plates.
Figure 10:
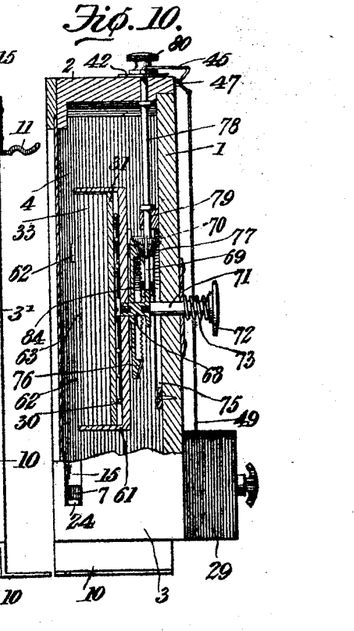
Fig. 10 is a sectional view on the line 10 10 of Fig. 9.
Figure 11:
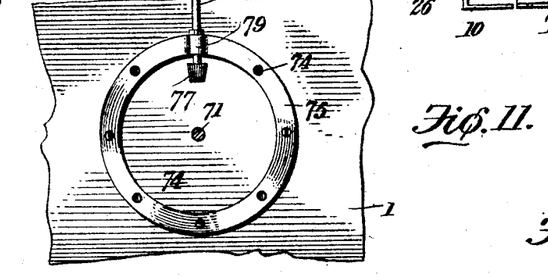
Fig. 11 is a detail front elevation of the back of the plate-holder with the magazine removed.
Figure 12:
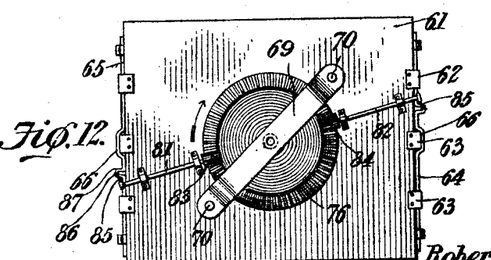
Fig. 12 is a detail rear elevation of the magazine.

In using the present attachment the magazine is charged with a stack of sensitized plates, the slide 5 is closed, and the plate-holder is fitted to the back of the camera-box, a portion of which has been shown at 88 in Fig. 4 of the drawings, the plate-holder being detachably secured to the camera by means of the usual catches 89 at the top and bottom of the camera or by any other preferred means. The slide 5 is then withdrawn and the foremost sensitized plate of the stack of plates 33 is exposed. It will here be explained that the dark box or carrier 9 may be attached to the plate-holder before or after the exposure is made. After the plate has been exposed and it is desired to remove the plate without removing the plate-holder from the camera-box the slides 15 and 15' are withdrawn and the finger-piece 41 in Figs. 1 to 4, inclusive, and 80 in Figs. 9 and 10 is turned to release the motor 29, and thereby start the conveyer 24, while at the same time the spring-fingers 35 in Figs. 1 to 7, inclusive, and 62 in Figs. 9 to 13, inclusive, are withdrawn from the plate and the fingers 34 in one form of the device and 63 in the other form are thrust inwardly in rear of the foremost plate, so as to displace said plate forwardly out of the magazine and at the same time to retain the remaining plates within the magazine. When the plate is displaced from the magazine, it drops down edgewise upon the conveyer 24 and is transferred through the slots 7 and 8 into the dark box 9, whereupon the handle 41 or the handle 80 is returned to its original position, thereby stopping the motor and returning the retaining spring-fingers to their original positions, so as to hold the stack of plates in the magazine, the other spring-fingers of course being withdrawn from the stack of plates, so as to permit the spring-pressed follower 31 to shift the stack forwardly into engagement with the retaining-fingers. The slides 15 and 15' are then closed, whereupon the dark box or carrier 9 may be detached from the plate-holder and taken to a dark room, where the exposed plate may be safely removed from the box. This operation is repeated as often as an exposure is made, whereby the several plates may be successively removed from the camera and taken to a dark room without detaching the plate-holder from the camera, thereby materially facilitating the exposure of the several sensitized plates.

Instead of actuating the rock-bars 64 and 65 by means of the independent pinions 83 and 84 it is proposed to actuate each of these bars from a single pinion 88, (shown in Figs. 14 and 15,) said pinion being in mesh with the gear 76 and carried by a shaft 89, suitably journaled upon the back of the magazine and extending to one edge thereof, preferably the bottom edge, where it is provided with a crank-arm 90, working across the bottom of the magazine. From this crank-arm connecting-rods 91 and 92 lead outwardly in opposite directions in substantial parallelism with the bottom of the magazine and have their outer ends connected to the respective terminal cranks 93 and 94, provided upon the bottoms of the respective rock-bars 65 and 64, which are of course projected below the bottom of the magazine in order that they may be connected with the rods or bars 91 and 92. The cranks 93 and 94 are of course reversely arranged in order that the rock-bars may be simultaneously rocked or rotated by the movement of the crank-arm 90 in one direction.

From the foregoing description it will be understood that each embodiment of the invention is complete in itself and capable of being attached to any ordinary camera-box without change therein, and the dark box or carrier is independent of and separable from the camera and the plate-holder. The plate-holder, in which the conveyer is located, and the dark box or carrier are provided with slots or openings adapted to register, and thereby permit passage of an exposed plate or film from the holder to the box, and said elements are provided with slides to close the openings, whereby in studio and other uses the operation of successively exposing the plates may be continued without interruption and after each exposure the exposed plate may be conveyed from the camera to the dark box. In other words, the removal of an exposed plate from the camera does not involve removing the plate-holder and it does not become necessary to remove the plate-holder from the camera except to recharge the magazine thereof after the last plate has been exposed.

Having thus described the invention, what is claimed is—

1. A camera attachment comprising a casing formed with a slot for the passage of plates, a holder supported within said casing, a traveling conveyer below said holder to receive plates therefrom successively, and means for releasing the plates one at a time from said holder.

2. A camera attachment comprising a casing, a receiver communicating with the casing by means of a passage-way for plates, a plate-holder supported within the casing, a traveling conveyer within the casing below the plate-holder and in line with said passage-way, and means for releasing the plates from the holder successively upon said conveyer.

3. A camera attachment comprising a casing and a receiver communicating with the casing by means of a passage-way for plates, a plate-holder supported within said casing, a spring-pressed follower within said holder, a plurality of fingers for retaining the plates within the holder, means for disengaging said fingers to release the plates successively, and means for supporting the released plate and conducting it to the receiver.

4. In a camera, a shiftable plate-holder, and means for carrying an exposed plate away from the holder in any shifted position of the latter.

5. In a camera, a rotatably-shiftable plate-holder, and means for carrying an exposed plate away from the holder in any shifted position thereof.

6. In a camera, a plate-holder mounted for rotatable shifting upon a substantially horizontal axis, and a conveyer disposed below the holder to receive and carry off exposed plates discharged from the holder in any position thereof.

7. In a camera attachment, the combination with a casing, of a receiver communicating with said casing, a plate-holder pivotally supported within said casing, means for turning said holder upon its pivotal support, and means within said casing for supporting a plate as it is released from the holder and conducting it to the receiver.

8. In a camera attachment, the combination with a casing, and a receiver so arranged with relation to said casing as to receive plates therefrom, a plate-holder pivotally supported within the casing, means for retaining the plates within the holder and for releasing them therefrom successively, means for turning the holder upon its pivotal support, and a traveling conveyer below the holder to support the plates and conduct them to the receiver.

9. In a camera attachment, the combination with a casing, of a plate-holder supported therein, a receiver communicating with said casing, means for releasing the plates from the holder successively, an endless conveyer below the holder, and a motor for operating said conveyer.

10. In a camera attachment, the combination with a casing, and a receiver communicating with said casing by a passage-way, of a plate-holder supported within the casing, spring-fingers at opposite ends of the casing to retain the plates within the holder, means for moving said fingers to release one plate at a time, a spring-pressed follower within the holder, and an endless conveyer below the holder and in line with the passage-way between the casing and receiver.

11. In a camera attachment, the combination with a casing, and a receiver supported at one side of the casing and communicating therewith, of a plate-holder within the casing, an endless conveyer below the holder, means for driving said conveyer, spring-fingers at opposite ends of the holder to engage the outer one of the plates in the holder, a crank-shaft mounted in said casing, and connections between said crank-shaft and fingers for moving the latter.

12. In a camera attachment, the combination with a casing, of a plate-holder, and a rotatable push-rod which is tensioned in the direction of its endwise movement and to which the plate-holder is secured for turning therewith.

13. In a camera attachment, the combination with a casing, of a plate-holder, and means for pivotally supporting the holder within the casing, comprising a spring-controlled push-rod extending through the back of the casing and provided with a knob, and means for preventing the rotation of the push-rod until after it has been pushed inward.

14. In a camera attachment, the combination with a casing, and a receiver-box, of a plate-holder supported within the casing, gripping-fingers at opposite ends of the holder, connected crank-shafts having a plurality of bends to span said fingers, and means for simultaneously moving said connected shafts.

15. In a camera attachment, the combination with a casing, and a receiver-box, of a plate-holder within said casing, a conveyer for transferring the plates successively from the casing to the receiver, plate retaining and releasing fingers arranged at opposite ends of the holder, and means common to the fingers and the conveyer for controlling the same.

16. In a camera attachment, the combination with a casing and a receiver communicating therewith, of a plate-holder within the casing, means for successively releasing plates from the holder, a traveling conveyer below said holder, a motor for driving said conveyer, and means for simultaneously controlling said conveyer and releasing means.

17. In a camera attachment, the combination with a casing, and a receiver, of a plate-holder pivotally supported within the casing, gripping-fingers to control the release of the plates successively, and means for operating said fingers simultaneously when the holder is in either vertical or horizontal position.

18. In a camera, the combination with a plate-holder, of a separable receptacle for exposed plates, and means independent of the plate-holder for successively conveying the plates from the holder to the receptacle.

19. The combination with a plate-holder, of a motor-actuated plate-conveyer independent of the plate-holder, means for checking the motion of the conveyer, and a separable receptable to which leads the conveyer for carrying plates from the holder to the receptacle.

20. The combination with a plate-holder, of a motor-actuated endless plate-conveyer independent of the plate-holder, means for checking the motion of the conveyer, and a separable receptacle to which leads the conveyer for carrying plates from the holder to the receptacle.

21. A plate-holder having a magazine for containing a series of sensitized plates, plate-retaining means, means for discharging the foremost plate from the magazine when the plate-retaining means is released, means to carry the discharged plate away from the magazine, and means to simultaneously disengage the plate-holding means and actuate the plate-discharging means and the plate-carrying means.

22. A plate-holder having a magazine for containing a series of sensitized plates and capable of being turned, plate-retaining means, means for discharging the foremost of the series of plates from the magazine, and means for releasing the plate-retaining means and actuating the plate-discharging means in the different positions of the magazine.

23. A plate-holder having a magazine to contain a series of sensitized plates, means to turn the magazine, means carried by the magazine for retaining the plates therein, plate-discharging means carried by the magazine, and means carried by the plate-holder for releasing the plate-retaining means and actuating the plate-discharging means in the different positions of the magazine.

24. A plate-holder having a magazine to contain a series of sensitized plates, means to turn the magazine, plate-retaining means for the magazine, means to discharge the foremost of the series of plates from the magazine, and means to carry a discharged plate from the magazine in either position thereof.

25. A plate-holder having a magazine for containing a series of sensitized plates, means for turning the magazine, means for successively discharging plates from the magazine in either position thereof, a conveyer to carry off the discharged plate from the magazine in either of its positions, a motor for actuating the conveyer, and controlling means for simultaneously actuating the plate-discharging means and starting the motor.

26. A plate-holder having a magazine to contain a series of sensitized plates, means for successively discharging the plates from the magazine, a conveyer to carry the discharged plates away from the magazine, a motor for the conveyer, and manually-controlled means including a handle accessible from the exterior of the plate-holder to start the motor and actuate the plate-discharging means.

27. A plate-holder having plate-supporting means and provided with an opening for the removal of an exposed plate, means to normally close the opening, and a dark receptacle or carrier separably connected externally to the plate-holder and provided with an opening for registration with the discharge-opening of the plate-holder and having a closure for its opening.

28. A plate-holder having means for supporting a sensitized plate and provided with an opening for the discharge of an exposed plate, a bracket carried externally by the plate-holder, and a dark receptacle or carrier capable of being movably supported upon the bracket and provided with an inlet-opening for registration with the discharge-opening of the plate-holder.

29. A plate-holder having an opening for the discharge of an exposed plate, a bracket carried by the plate-holder, a dark receptacle or carrier capable of being detachably supported upon the bracket and provided with an inlet-opening for registration with the discharge-opening of the plate-holder, and a detachable connection between the plate-holder and the carrier including a spring-clip and a member to be snapped into engagement therewith.

In testimony that we claim the foregoing as our own we have hereto affixed our signatures in the presence of two witnesses.

ROBERT JOSHUA LONDON.
JAMES ALLEN LONDON.

Witnesses:
ARTHUR GRAHAM,
H. L. MILLER.